United States Patent [19]

Moore

[11] 4,213,633

[45] Jul. 22, 1980

[54] TWO-STAGE VEHICLE SPRING SUSPENSION

[76] Inventor: Robert G. Moore, Wilroy Acres, R.D. #4, Elkhart, Ind. 46514

[21] Appl. No.: 920,494

[22] Filed: Jun. 29, 1978

Related U.S. Application Data

[63] Continuation of Ser. No. 745,706, Nov. 29, 1976, abandoned.

[51] Int. Cl.$^2$ ............................................. B60G 11/22
[52] U.S. Cl. .................................. 280/716; 267/21 R
[58] Field of Search ............... 280/680, 681, 686, 687, 280/715, 716, 717; 267/19 R, 21 R, 30, 63 R, 63 A, 22 A

[56] References Cited

U.S. PATENT DOCUMENTS

| | | | |
|---|---|---|---|
| 2,998,266 | 8/1961 | Hickman | 267/63 |
| 3,301,573 | 1/1967 | Hickman | 280/681 |
| 3,606,376 | 9/1971 | Hickman | 280/715 |
| 3,811,700 | 5/1974 | Moore | 280/717 |

Primary Examiner—John J. Love
Assistant Examiner—John A. Carroll
Attorney, Agent, or Firm—Harold I. Popp

[57] ABSTRACT

A two-stage spring suspension is provided by employing vertically acting rectilinear movement shear rubber springs as full range springs, and vertically acting compression springs to provide helper or second stage springs essentially operative only under heavier loading. Desirably the compression springs are in the form of upright action rubber bodies. The subject disclosure is patterned after the single stage suspension shown in my U.S. Pat. No. 3,811,700, dated May 21, 1974. As compared with this patented disclosure, this invention reduces the rubber and metal required, retaining equal capability, stability and rollover or sidesway control, reduces the unsprung weight and cost, has a longer effective life, and, of course, a softer and better ride at low loadings.

3 Claims, 7 Drawing Figures

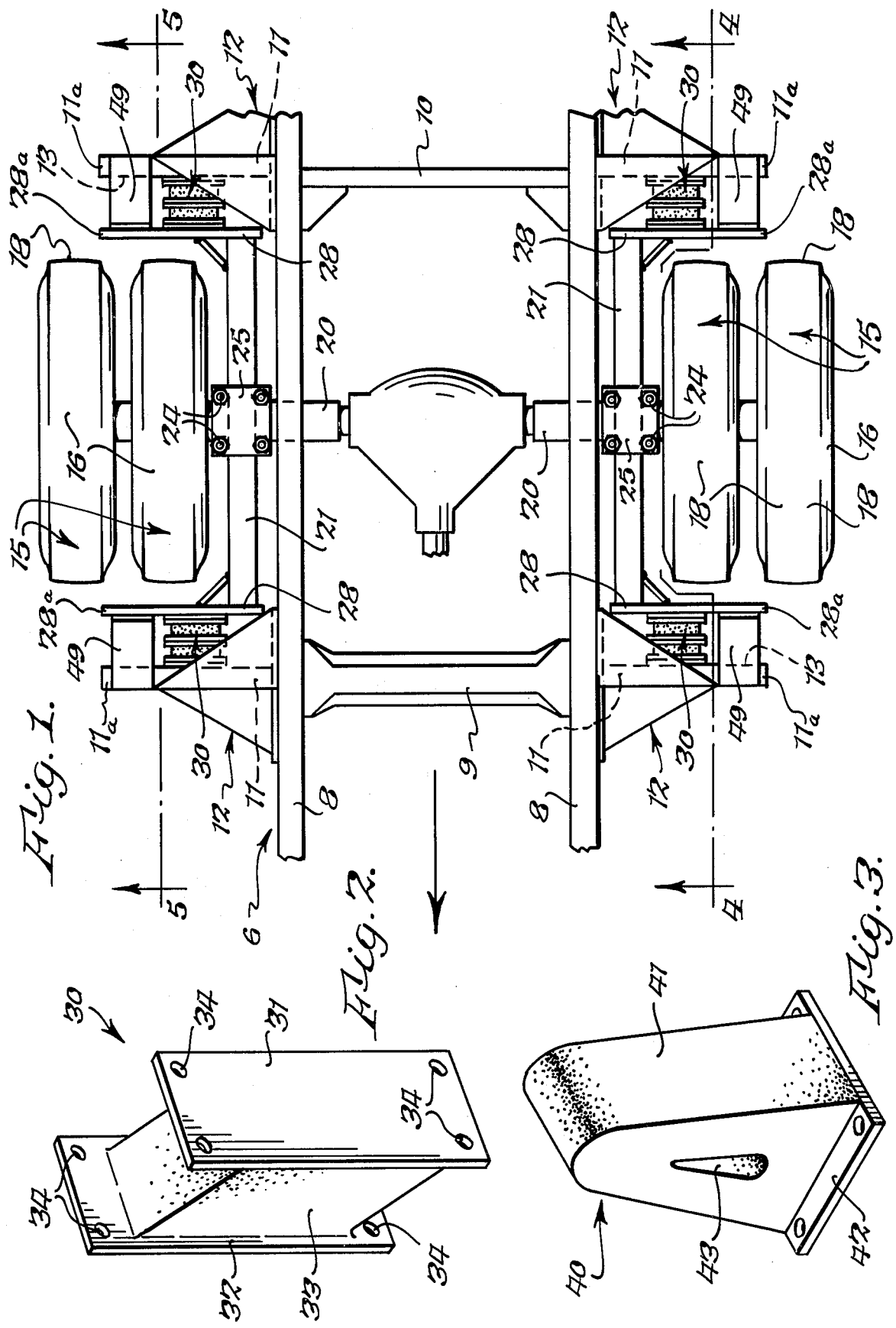

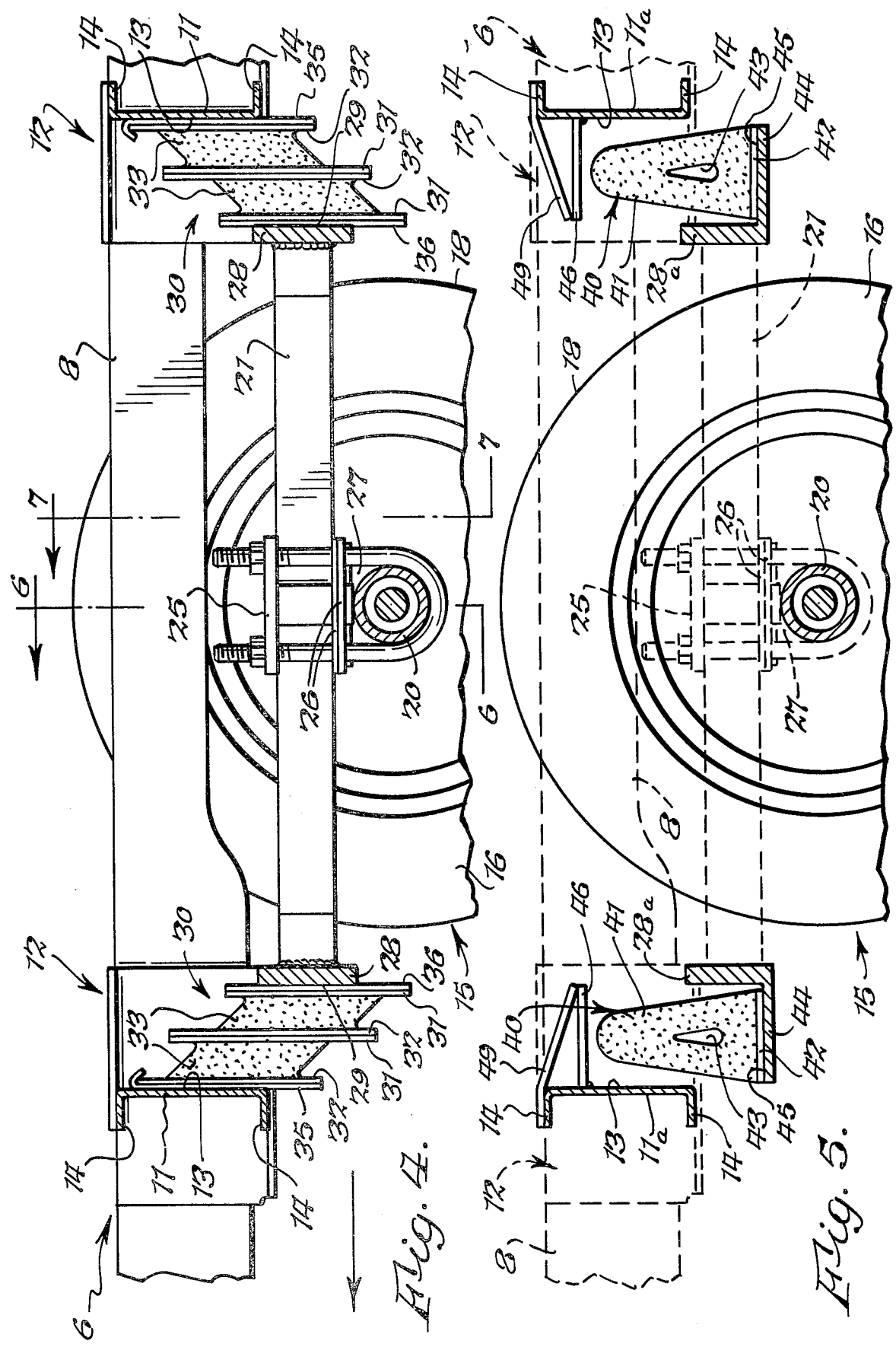

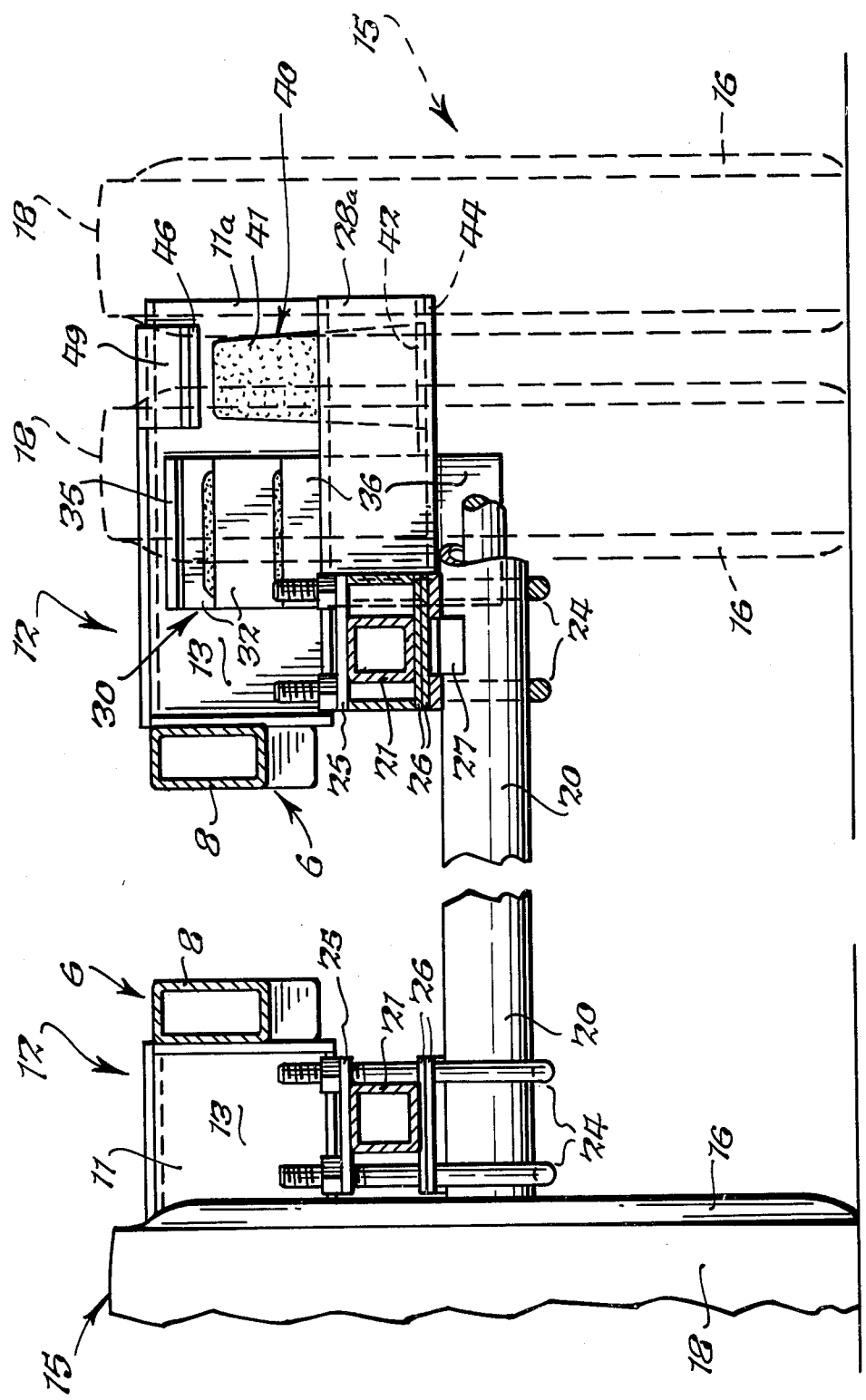

TWO-STAGE VEHICLE SPRING SUSPENSION

This is a continuation of application Ser. No. 745,706 filed on Nov. 29, 1976, and now abandoned.

Accordingly, an object of the invention is to provide a two-stage, friction free spring suspension for a softer and better ride at low loadings.

Another object is to reduce the amount or volume of rubber, as well as the amount of metal, required, without sacrifice of the capacity, stability, rollover or sidesway control, at all loadings, of similar single stage suspensions.

Another object is to reduce the unsprung weight of the suspension.

Another object is to increase the effective life of the suspension, the helper compression springs not being full time springs.

Another object is to reduce the cost of the suspension, particularly in the volume of rubber required.

Another object is to reduce the number of rubber springs required.

Other objects and advantages of the invention will be apparent from the following description and drawings in which:

FIG. 1 is a fragmentary top plan view of a vehicle frame supported by a two-stage spring suspension embodying the present invention, the suspension being shown unloaded except for the weight of the frame.

FIG. 2 is a perspective view of one of the rectilinear vertical movement shear rubber springs used as the full range springs.

FIG. 3 is a perspective view of one of the limited action compression springs activated as helper springs only during the second stage of springing, this spring being shown in the form of a compression rubber body of predetermined height.

FIG. 4 is an enlarged fragmentary vertical longitudinal sectional view thereof, taken generally on line 4—4 of FIG. 1.

FIG. 5 is an enlarged fragmentary vertical longitudinal section taken generally on line 5—5 of FIG. 1.

FIGS. 6 and 7 are vertical transverse sectional views taken generally on the correspondingly numbered lines of FIG. 4.

FULL RANGE SPRING SUSPENSION

The main frame 6 of the vehicle can be of any suitable construction and is shown as comprising a pair of main longitudinal side frame beams 8 of rectangular form in cross section and suitably connected together by cross beams 9, 10. Adjacent each end of each cross beam 9 and 10 a horizontal cantilever channel bar 11, forming a frame bracket, is welded to the outside of the corresponding main longitudinal side frame beam 8 and projects outwardly therefrom generally in line with the corresponding cross beam 9 or 10. Each cross channel bar is regidified, with reference to its main longitudinal side frame beam 8, by a suitable array 12 of gusset plates welded to both. The frame brackets 11 on each side of the vehicle frame are arranged with their vertical web faces 13 opposing each other and with their flanges 14 extending away from the wheels between the frame brackets.

The numeral 15 represents a dual wheel at each side of the vehicle frame, each of these dual wheels having rubber tires 16 provided with treads 18. Each of these dual wheels is conventionally journalled on the round tubular end spindle of a tubular axle 20.

A horizontal torsionally rigid out-of-round beam 21 is supported at its central part on each end of the axle 20 and extends lengthwise of the line of movement of the vehicle frame to points adjacent the treads 18 of the corresponding dual wheel tires 16. To provide its torsional rigidity each beam 21 is preferably made of tubular, rectangular or box form in cross section as best shown in FIGS. 6 and 7 and each of these beams have sufficient torsional and vertical bending strength to transmit all vertical forces from the vehicle frame 6 directly to the end of the drive axle 20.

Each torsionally rigid axle beam 21 is centrally mounted, below the space between each main longitudinal side frame beam 8 and wheel 15, on the end of the axle 20. This mounting is illustrated in greater detail in my said U.S. Pat. No. 3,811,700, dated May 21, 1974. Thus, a pair of U-bolts 24 clamp each axle beam 21 to its axle end, the U-bolts having their round parts embracing and closely fitting the underside of the cylindrical end of the axle 20. The upstanding legs of each U-bolt extend through corner holes in a flat rectangular metal top plate 25 and similar bottom plates 26. The nuts of the U-bolts screw down against the corners of the top plate 25 to clamp the axle beam 21 between these plates and the axle 20 against the underside of the bottom plate 26. Lugs 27 welded to each axle end provide a flat top face for the central part of the bottom plates 26.

The cantilevered frame bars 11 are arranged beyond the ends of each torsionally rigid axle beam 21 and form frame brackets which cooperate with axle brackets 28 severally welded to the opposite ends of each torsionally rigid axle beam 21. Each axle bracket is in the form of a thick vertical rectangular plate welded to its end of its torsionally rigid axle beam to project horizontally laterally therefrom, away from the vehicle frame, to a position spaced from the front and rear side of each tire 16. Each axle bracket 28 has an upright face 29 opposing the upright face 13 of a companion frame bracket 11.

The full range resilient support for the frame brackets 11 on the axle brackets 28 are the shear rubber rectilinear movement shear rubber springs 30 best illustrated in FIG. 2. Each comprises a rectangular sheet metal plate 31; an identical sheet metal plate 32; and a flexible rubber body 33 interposed between and vulcanized to the opposing faces of these plates. The rubber body is rectangular in planes parallel with the plates but is of parallelogram form in vertical planes perpendicular thereto. The rubber bodies are centered with reference to their plates and are mounted with the plates upright. In operative static position therefore each plate 32 is higher than its companion plate 31. Each plate 31, 32 is provided with corner bolt holes 34 which mate with one another and with bolt holes in plates 35, 36 fixed to the frame and axle brackets 11, 28. For simplicity, the many bolts through these holes are not shown.

OPERATION—MAIN SPRINGS OF THE SUSPENSION

In the operation of the suspension, upward movement of either drive wheel 15, through its end of the axle 20, effects a corresponding upward movement of the center part of the torsionally rigid beam 21 fixed to this axle end. This effects a corresponding movement of the axle brackets or plates 28 at the opposite ends of each torsionally rigid beam 21. This movement is yieldingly resisted by the two arrays of rectilinear movement shear rubber springs 30 connected with these axle brackets 28 at one end and connected with the cantilever channel-shaped frame bars or brackets 11 of the vehicle frame 8 at their opposite ends.

It will be noted that since the rubber bodies 33 of the rectilinear movement shear rubber springs 30 permanently connect the frame brackets 11 with the axle brackets 28, they are operative not only in the first stage springing but throughout the entire range of action. They not only provide light first stage springing for the empty or lightly laden body but also are increasingly effective as the load increases. They, therefore, have two functions; one: to provide light spring support for the empty or lightly laden body, and, two: to contribute a major portion of the spring support for the load on the body up to its fully laden condition.

SECOND STAGE OR HELPER SPRING SUSPENSION

The second or helper stage of springing, required to support the vehicle when heavily laden, is provided by the limited vertical action compression springs 40 illustrated in FIG. 3. While these could be helical metal compression springs, they are shown as sugarloaf shaped vertical compression rubber bodies 41 vulcanized to a bottom plate 42. Preferably each also has a teardrop shaped bore 43 extending horizontally therethrough. Each compression spring has a predetermined vertical dimension, or effective height. They are mounted between the frame and axle brackets 11, 28 so that they contribute little, if anything, to the support of the unladen vehicle, but become fully effective, in team with the shear rubber springs 30, as the vehicle is loaded. This is accomplished by the selected vertical spacing of the frame and axle brackets 11a and 28a between which these compression rubber springs 40 are interposed.

These last frame and axle brackets 11a and 28a are horizontal outward extensions of the frame and axle brackets 11 and 28 for the shear rubber springs 30. In addition, each axle bracket extension 28a is provided with a horizontal bottom flange 44 which projects away from the axle 20. This forms a shelf or base having a flat upper face 45 supporting the bottom plate 42 of a companion compression spring 40. These can be secured together by bolts (not shown).

The second or helper spring structure can be completed by a horizontal plate 46 welded to its frame bracket 11a directly above the companion flange 44 of the axle bracket 28a. Each has a bottom horizontal face 48 opposing the top face 45 of the companion shelf 44. Each plate 46 is also shown as reinforced by a top plate 49 which extends over the top and can be welded to the companion frame bracket extension 11a.

OPERATION—HELPER OR SECOND STAGE SPRINGS

It will be noted (FIG. 5) that the tops of the compression rubber springs 40 are below and out of contact with the bottom faces 48 of the frame bracket plates 46. This is within the frame assumed to be unloaded and is illustrative of these compression rubber bodies being effectively out of service until the chassis carries a substantial load. In service, however, the secondary compression rubber spring bodies 41 would probably always have some insignificant contact with the bottom faces 48 of overhead plates 46 of the frame brackets 11, 11a.

With added increments of load, the primary shear rubber springs 30 are stressed more and more toward a rectangular form as viewed in FIG. 4. Also the secondary or helper compression springs 40 are brought into contact with the bottom faces 48 of the horizontal plates 46 of the frame brackets 11, 11a and move downwardly to compress their rubber bodies 41 more and more.

Further increases in load now act in shear and compression against all of the shear and compression rubber springs 30, 40. Heavy loads are adequately supported by all the rubber in the suspension. But empty body or light loads are lightly supported to provide a more comfortable ride with little tendency toward destructiveness.

ADVANTAGES

Many advantages flow from the structure which are not immediately apparent.

Of course the major advantage of the two-stage spring support is obvious.

1. Such two-stage springing provides a softer and better ride at low loadings. But, as compared with the single-stage suspension shown in my said U.S. Pat. No. 3,811,700 in which sixteen shear rubber springs or sandwiches provide the resilient support, the subject structure has the following additional advantages:

2. Less rubber is required. Four compression rubber springs 40 supplant eight shear rubber springs and less volume of rubber is needed.

3. These compression helper rubber springs are not full time springs but come into action only when needed. They can be made lighter for such limited service.

4. As a result the subject suspension is cheaper in cost of rubber, an increasing cost factor with present fuel shortages.

5. There is also a reduction in stress, required metal and cost in the frame brackets 11, 11a and axle brackets 28, 28a. In this it will be noted that the compression rubber helper springs 40 are outboard of the shear rubber springs 30. Consequently these brackets can be made lighter as their outboard loadings are only under relatively heavy loads. If the positions of the shear rubber springs 30 and compression rubber springs 40 were reversed, these brackets would be subject to continuous outboard loadings.

6. At the same time such outboard placement of the helper or compression rubber springs 40 does not reduce the rollover and sidesway properties of the structure in the patent. This most important attribute flows from the wide placement of the rubber bodies as wide or wider than the tires 16 themselves. This compares with the necessarily very close placement of conventional leaf springs which thereby provide sharply reduced rollover and sidesway control as compared with the subject structure. In this it will be noted that the widely placed outboard compression rubber springs 40 are fully effective against rollover and sidesway when needed—namely, when the vehicle is loaded. 7. The capacity and stability of the vehicle at all loadings is not affected by the use of the helper or second stage compression rubber springs 40.

8. Also, these compression rubber springs 40 are ideally located for their own protection.

9. Fewer springs are required.

10. The saving in weight, both rubber and metal, is essentially a saving in unsprung weight.

While the invention has been illustrated as embodied in a single axle suspension, it is equally applicable to a tandem axle suspension as shown in U.S. Pat. No. 3,301,573, dated Jan. 11, 1967.

What is claimed is:

1. A two stage vehicle spring suspension adapted to be interposed between a vehicle frame having a longitudinal centerline, and a single axle supported by rubber tired wheels at its opposite ends, and comprising a torsionally rigid axle beam generally parallel with said centerline and fixed at its center to each axle end along the side of its tire toward said centerline and its ends being arranged adjacent the tread of its tire, a frame bracket secured to said frame to project outwardly to be in alinement with each end of each beam and the tread of each tire, and an axle bracket fixed to each beam end and interposed between the companion tire tread and each frame bracket; wherein the invention comprises a vertically acting rectilinear movement first stage shear rubber spring interposed between and fixed to each pair of said frame and axle brackets a first distance from said centerline, a vertically acting second stage compression spring of predetermined effective height alongside each shear rubber spring and fixed to one of each pair of said brackets, said predetermined effective height being such as to cause said compression springs to come into operative relation with the other of each pair of said brackets when a predetermined load is imposed on said frame, and said compression springs being arranged a second distance from said centerline, said second distance being greater than said first distance and all of said springs being arranged generally in the same horizontal plane whereby said compression springs are outboard from said shear springs to provide wider effective spring centers for said frame under heavy load conditions and thereby reduce sidesway and the danger of roll over of the frame when loaded but to be substantially ineffective when the frame is empty and thereby provide a soften empty body ride.

2. A two stage vehicle frame suspension as set forth in claim 1, wherein each compression spring is in the form of a resilient rubber body.

3. A two stage vehicle frame suspension as set forth in claim 1, wherein each compression spring is out of contact with one of its pair of brackets when the vehicle frame is empty.

* * * * *